United States Patent [19]

Kawakami

[11] Patent Number: 4,700,095

[45] Date of Patent: Oct. 13, 1987

[54] CONSTRUCTION FOR INSTALLING A STEPPING MOTOR OF A FLOPPY DISK DRIVE UNIT

[75] Inventor: Chikahisa Kawakami, Tokyo, Japan

[73] Assignee: Kabushiki Kaisha Toshiba, Kawasaki, Japan

[21] Appl. No.: 935,223

[22] Filed: Nov. 26, 1986

[30] Foreign Application Priority Data

Nov. 30, 1985 [JP] Japan .................................. 60-269662

[51] Int. Cl.$^4$ .......................... H02K 5/06; G11B 5/56
[52] U.S. Cl. ...................................... 310/91; 310/89; 360/106
[58] Field of Search .................. 310/12, 13, 42, 89, 310/91, 112, 118; 360/106, 107

[56] References Cited

U.S. PATENT DOCUMENTS

| | | | |
|---|---|---|---|
| 3,881,189 | 4/1975 | Mayeda | 360/106 |
| 4,161,004 | 7/1979 | Dalziel | 360/106 |
| 4,227,101 | 10/1980 | Malakian et al. | 310/89 |
| 4,577,521 | 3/1986 | Takikawa | 360/106 |

Primary Examiner—Patrick R. Salce
Assistant Examiner—D. L. Rebsch
Attorney, Agent, or Firm—Cushman, Darby & Cushman

[57] ABSTRACT

Disclosed is a construction for installing a stepping motor on a frame. A securing portion is provided for the stepping motor such that it is located in a plane perpendicular to the rotating shaft of the stepping motor. The securing portion has an installation hole extending parallel to the steel belt. A guide member is provided on the frame. This member guides the securing portion in a direction parallel to the steel belt, so that set screws do not change its orientation.

5 Claims, 9 Drawing Figures

CONSTRUCTION FOR INSTALLING A STEPPING MOTOR OF A FLOPPY DISK DRIVE UNIT

BACKGROUND OF THE INVENTION

The present invention relates to a construction for installing the stepping motor of a floppy disk drive unit to a frame, and more particularly, to a construction for enabling the stepping motor to be installed with ease and high accuracy.

A conventional construction for installing the stepping motor of a floppy disk drive unit is shown in FIG. 1, in which reference numerals 10 and 16 denote a carriage and a stepping motor, respectively. Pulley 14 is attached to the rotating shaft of stepping motor 16. Steel belt 12 is wound around pulley 14, and the ends of steel belt 12 are secured to carriage 10. Securing portion 18 projects from each side of stepping motor 16. An elongated hole, which extends in a perpendicular direction to the rotating shaft, is provided in each securing portion 18. Setscrew 22 is inserted into elongated hole 22 and is threadedly fitted into a tapped hole formed in the frame.

In the floppy disk drive unit described above, stepping motor 16 must be moved such that carriage 10 is accurately positioned with reference to the predetermined position of the disk, so as to ensure compatibility among different disks. Conventionally, this positional adjustment has been made in the following manner. First, stepping motor 16 is temporarily secured to the frame of the floppy disk drive unit, in the state where setscrew 20 is not fastened. Next, carriage 10 is coupled to stepping motor 16 by use of pulley 14 and steel belt 12. Thereafter, stepping motor 16 is excited such that the rotational angle of the rotating shaft corresponds to the angle determined by the reference position of a disk used for position adjustment, thereby magnetically fixing the rotating shaft at the position determined by the reference rotational angle. Under this condition, the position of a magnetic head provided on carriage 10 is adjusted to the reference position of the disk used for position adjustment. More specifically, stepping motor 16 is moved in the direction indicated by arrow 24 in FIG. 1, i.e., parallel to steel belt 12, while simultaneously permitting the magnetic head to read the data stored in the disk. At this time, carriage 10 moves together with stepping motor 16, so that the magnetic head moves on the disk. After the magnetic head is moved to the position corresponding to the reference position of the disk, setscrew 20 is fastened, thus completing the position adjustment between stepping motor 16 and carriage 10.

When fastening setscrew 20, torque may be applied to stepping motor 16, so that stepping motor 16 may rotate in a horizontal plane. When this happens, however, steel belt 12 is twisted slightly, so that the accuracy of the adjustment is not significantly affected. For this reason, conventional stepping motor 16 is not provided with a guide member for guiding the movement of stepping motor 16 in the direction of arrow 24.

With the recent miniaturization in floppy disk drive units, smaller stepping motors have been developed. FIG. 2 illustrates a conventional construction for installing such small stepping motors. Referring to FIG. 2, stepping motor 38 is disk-shaped. Securing-portion 40 of stepping motor 38 is located in a plane perpendicular to the rotating shaft of motor 38. Pulley 36 is attached to the end of the rotating shaft. Steel belt 32 is wound around pulley 36, and the ends of steel belt 32 are secured to the side wall of carriage 30. An arcuately elongated hole is provided in each securing portion 40 such that the center of the arcs is located at the rotating shaft. Setscrew 46 is inserted in elongated hole 42 and is threadedly fitted into a tapped hole formed in frame 34. Circular projection 39 is formed at the foot of the rotating shaft of stepping motor 38. Stepping motor 38 is positioned by fitting projection 39 into a hole formed in frame 34.

When installing the small stepping motor mentioned above, adjustment is made in the following fashion. First, stepping motor 38 is temporarily secured to the frame of the floppy disk drive unit, in the state where setscrew 46 is not fastened. Next, carriage 30 is coupled to stepping motor 38 by use of pulley 36 and steel belt 22. Thereafter, stepping motor 38 is excited such that the rotational angle of the rotating shaft corresponds to the angle determined by the reference position of a disk used for position adjustment, thereby magnetically fixing the rotating shaft at the position determined by the reference rotational angle. Under this condition, the position of a magnetic head provided for carriage 30 is adjusted to the reference position of the disk used for position adjustment. More specifically, stepping motor 38 is rotated in the direction indicated by arrow 48 in FIG. 2, while simultaneously permitting the magnetic head to read the data stored in the disk. With rotation of stepping motor 38, carriage 30 moves linearly, so that the magnetic head provided for carriage 30 also moves on the disk. After the magnetic head is moved to the position corresponding to the reference position of the disk, setscrew 46 is fastened, thus completing the position adjustment between stepping motor 38 and carriage 30.

When fastening setscrews 46, however, torque may be applied to the stepping motor, due to the friction between the screws and the securing portions, so that stepping motor 38 is apt to be shifted from the reference position. Therefore, stepping motor 38 cannot be always adjusted with high accuracy when is installed. If the rotating shaft of stepping motor 38 is moved 1.0°, carriage 30 will move by the distance corresponding to one pitch of the tracks on the floppy disk. As can be seen from this, the adjustment is significantly affected even if stepping motor 38 is shifted only slightly from the reference position.

One object of the present invention is to provide a stepping motor-installing construction which enables adjustment to be made with high accuracy, even when a small stepping motor is installed.

Another object of the present invention is to provide a stepping motor installing construction which enables a stepping motor to be installed with ease and high accuracy, even by an unskilled person.

SUMMARY OF THE INVENTION

The above objects are achieved by providing a guide member which linearly guides the securing portion of a small stepping motor in parallel to the steel belt. If such a guide member is provided, the stepping motor is allowed to move only linearly, so that it is prevented from rotating, inspite of the torque which may be applied to the stepping motor when the setscrews are fastened. As a result, the adjustment can be made with high accuracy. Further, when the setscrews are fastened, the stepping motor need not be fixed by means of a jig or the like. Therefore, the stepping motor can be installed or adjusted with ease and high accuracy even by an unskilled person.

In the preferred embodiments of the present invention, the guide member is formed integrally with a die-cast frame such that it projects from the frame. The guide member is brought into sliding contact with the side walls of the securing portion of the stepping motor, thus guiding the securing portion.

BRIEF DESCRIPTION OF THE DRAWINGS

The above and other objects of the present invention will become more apparent in the following descriptions and the accompanying drawings in which.

DETAILED DESCRIPTION OF THE PREFERRED EMBODIMENTS

Figure 1:
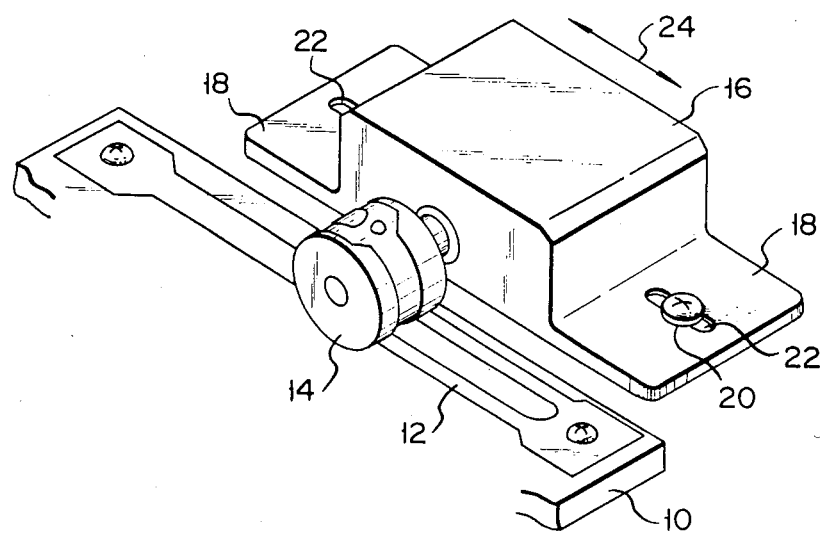
FIG. 1 is a perspective view illustrating a conventional construction used for installing a stepping motor.
Figure 2:
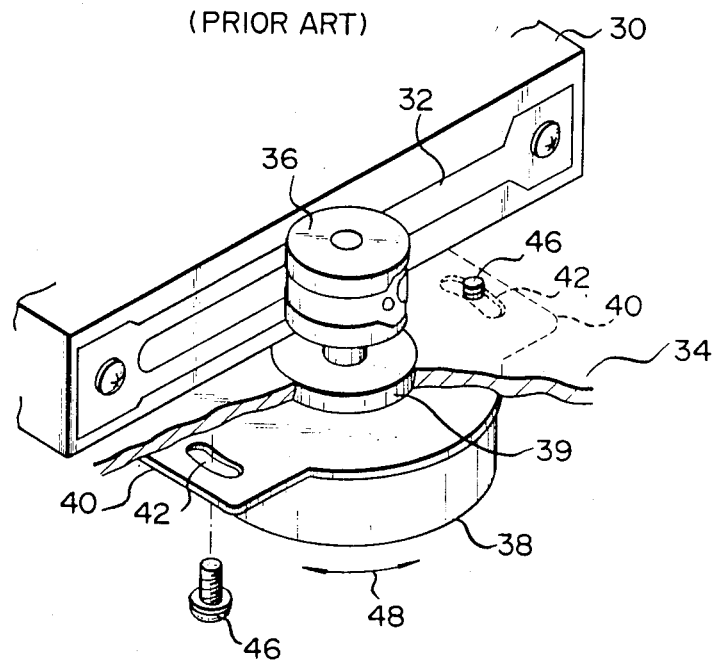
FIG. 2 is a perspective view illustrating a conventional construction used for installing a small stepping motor.
Figure 3:
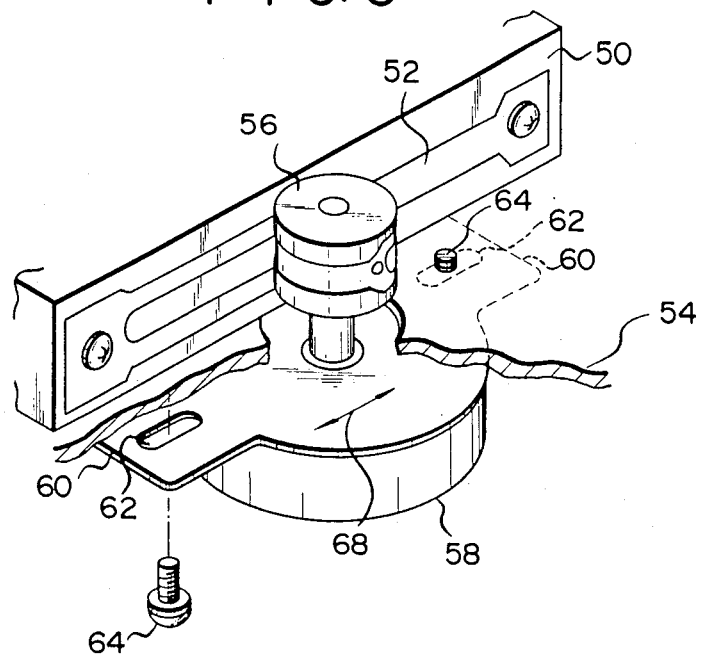
FIG. 3 is a perspective view illustrating the upper portion of a construction according to the first embodiment of the present invention, the construction being used for installing a small stepping motor.
Figure 4:
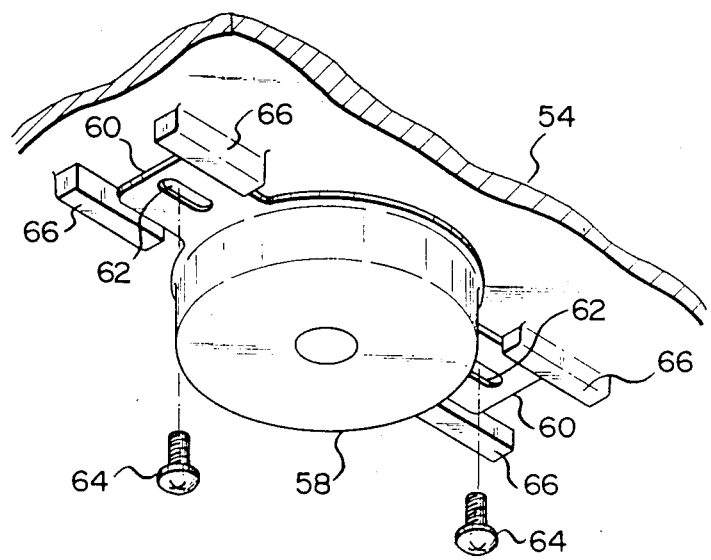
FIG. 4 is a perspective view illustrating the lower portion of the construction shown in FIG. 3.
Figure 5:
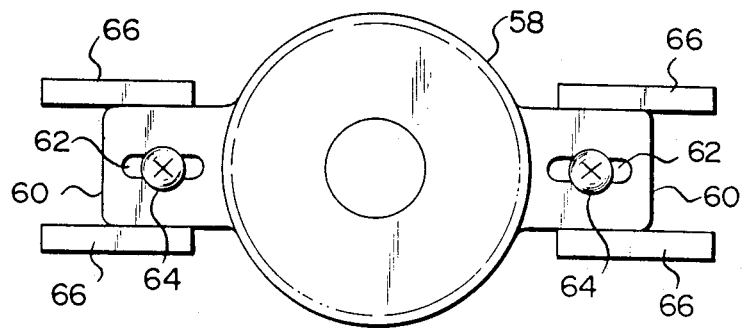
FIG. 5 is a view illustrating the bottom of the construction shown in FIG. 3.

FIGS. 3-5 show the first embodiment of the present invention. In these Figures, reference numeral 58 denotes a small stepping motor. Stepping motor 58 is thin and disk-shaped. It is attached to the lower surface of frame 54, which is die-cast and formed of an aluminum alloy. The rotating shaft of the stepping motor passes through frame 54 and extends upward from the upper surface of frame 54. Pulley 56 is attached to the rotating shaft, and steel belt 52 is wound around pulley 56. Steel belt 52 is secured, at both ends, to the side wall of carriage 50. A pair of securing portions 60 project from the upper edge of the circumferential wall of stepping motor 58, in the radial direction of stepping motor 58. Securing portions 60 are formed like a plate, and linearly elongated hole 62 is provided in each of securing portions 60. Holes 62 are formed such that they extend along a line passing through the center of the stepping motor and in parallel to steel belt 52. Setscrew 64 is inserted into hole 62 and is threadedly fitted into the tapped hole formed in frame 54.

Guide portions 66, which are integral with frame 54, project from the lower side of frame 54. Guide portions 66 have a substantially rectangular cross section and are located such that they are almost in contact with the respective side edges of securing portions 60. More specifically, there is a small gap between the side edges of securing portions 60 and the corresponding faces of guide portions 66. At the time of installing stepping motor 58, securing portions 60 are guided or restricted in movement by guide portions 66, so that stepping motor 58 is permited to move only parallel to steel belt 52, thus preventing stepping motor 58 from rotating.

In this embodiment, installation and adjustment of stepping motor 58 are performed in the following manner: First, stepping motor 58 is temporarily secured to the frame of the floppy disk drive unit, in the state where setscrew 64 is not fastened. Next, carriage 50 is coupled to stepping motor 58 by use of pulley 56 and steel belt 52. Thereafter, stepping motor 58 is excited such that the rotational angle of the rotating shaft corresponds to the angle determined by the reference position of a disk used for position adjustment, thereby magnetically fixing the rotating shaft at the position determined by the reference rotational angle. Under this condition, the position of a magnetic head provided for carriage 50 is adjusted to the reference position of the disk used for position adjustment. More specifically, stepping motor 58 is moved in the direction indicated by arrow 68 in FIG. 3, i.e., parallel to steel belt 52, while simultaneously permitting the magnetic head to read the data stored in the disk. At this time, carriage 50 moves together with stepping motor 58, so that the magnetic head moves on the disk. After the magnetic head is moved to the position corresponding to the reference position of the disk, setscrew 64 is fastened, thus completing the position adjustment between stepping motor 58 and carriage 50.

When setscrews 64 are fastened, torque may be applied to stepping motor 58, due to the friction between securing portions 60 and the head of setscrews 64. Even if such torque is applied, guide portions 66 prevent rotation of stepping motor 58. Therefore, accurate adjustment of stepping motor 58 can be made with ease. Such accurate adjustment is possible, even by an unskilled person.

Figure 6:
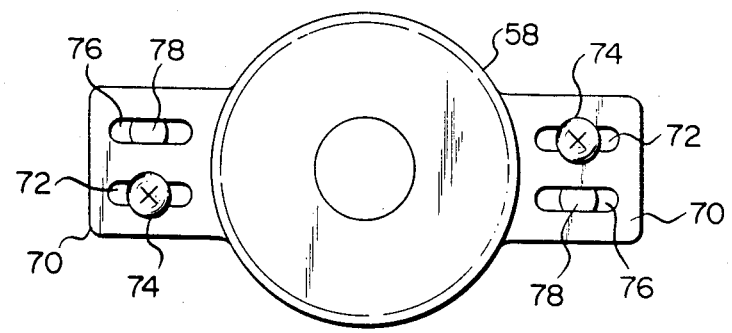
FIG. 6 is a view illustrating the bottom of a construction according to the second embodiment of the present invention.
Figure 7:
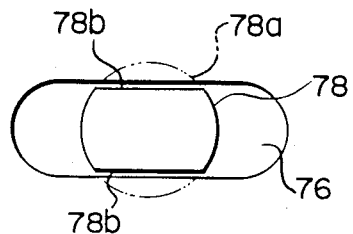
FIG. 7 is an enlarged view of the guiding hole provided in the construction shown in FIG. 6.

FIGS. 6-7 illustrate the second embodiment of the present invention. In this embodiment, stepping motor 58 has securing portions 70 which are wider than those of the stepping motor of the first embodiment. Elongated hole 72, into which setscrew 74 is inserted, and elongated guide hole 76 are formed in each securing portion 70. Guide projection 78, which is integral with frame 76, extends at the location corresponding to each guide hole 76. Guide projections 78 are formed simultaneously when frame 76 is die-cast. They are circular at the time of die-casting frame 76, as indicated by "78a" in FIG. 7. After forming frame 76 by die casting, the circumferential walls of projection 78 are subjected to cutting, thereby providing smooth guide surfaces 78b and 78c with high precision. Guide surfaces 78b and 78c thus obtained face the corresponding inner surfaces of guide holes 76 with a very small gap therebetween, thus guiding securing portions 70 reliably and accurately.

Figure 8:
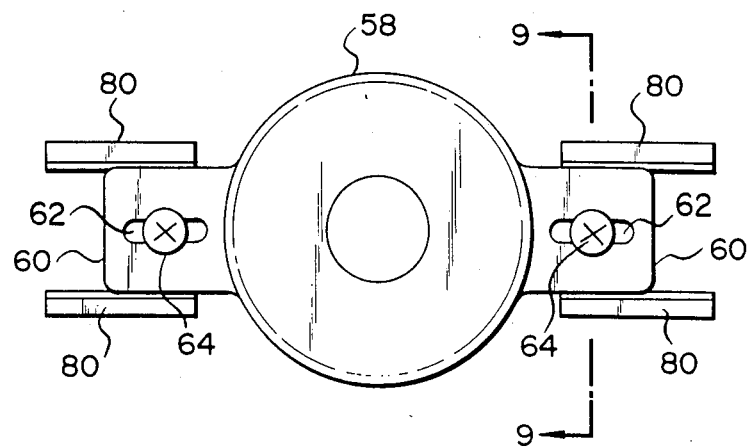
FIG. 8 is a view illustrating the bottom of a construction according to the third embodiment of the present invention.
Figure 9:
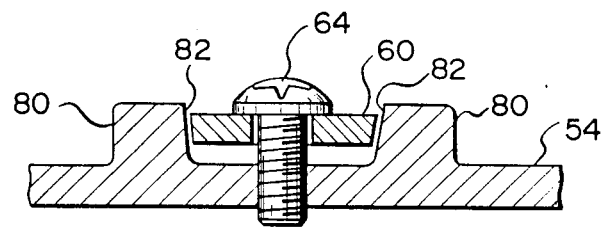
FIG. 9 is a sectional view, taken along line 9—9 in FIG. 8.

FIGS. 8 and 9 illustrate the third embodiment of the present invention. This embodiment is similar to the first embodiment shown in FIGS. 3-5, except that opposing guide surfaces 82 of guide portions 80 are slanted such that the distance between two guide surfaces 82 is decreased toward the base. In this embodiment, if setscrews 64 are threadedly inserted into the tapped holes by slightly turning them, the side edges of securing portions 60 are brought into slight contact with guide surfaces 82, completely eliminating the the unnecessary play between guide surfaces 82 and securing portions 60. Under this condition, stepping motor 58 is moved for adjustment, and then setscrews 64 are fastened completely. This embodiment is effective in making a very accurate adjustment.

The present invention is not limited to the above embodiments. It is obvious that those skilled in the art could easily modify or improve the present invention without departing from the spirit of the invention.

What is claimed is:

1. A construction for installing a stepping motor of a floppy disk drive unit to a frame, comprising:
   a pulley attached to a rotating shaft of the stepping motor;
   a steel belt wound around the pulley;
   a securing portion located in a plane perpendicular to the rotating shaft of the stepping motor, the securing portion having an elongated installation hole extending parallel to the steel belt;
   a guide member, provided for the frame, for guiding the securing portion only in a direction parallel to the steel belt; and
   a set screw inserted into the installation hole and threadedly fitted into a tapped hole provided in the frame.

2. A construction according to claim 1, wherein the frame is formed by die-casting, and the guide member integrally projects from the frame.

3. A construction according to claim 1, wherein the guide member is brought into contact with side edges of the securing portion, thereby guiding the securing portion.

4. A construction according to claim 1, wherein the securing portion is provided with an elongated guide hole extending parallel to the steel belt, and the frame is provided with a guide projection at a location corresponding to the guide hole, the guide projection being fitted into the guide hole, thereby guiding the securing portion.

5. A construction according to claim 3, wherein opposing surfaces of the guide member are so formed as to serve as guide surfaces, and the guide surfaces are slanted such that a distance between the guide surfaces is decreased toward a base surface of the frame.

* * * * *